United States Patent
Recchia, Jr.

(10) Patent No.: US 7,513,286 B2
(45) Date of Patent: Apr. 7, 2009

(54) HEAT SEAL DIE ASSEMBLY

(76) Inventor: Michael J. Recchia, Jr., 32 W. Schreiber, Roselle, IL (US) 60172

( * ) Notice: Subject to any disclaimer, the term of this patent is extended or adjusted under 35 U.S.C. 154(b) by 784 days.

(21) Appl. No.: 10/865,203

(22) Filed: Jun. 10, 2004

(65) Prior Publication Data

US 2005/0274262 A1 Dec. 15, 2005

(51) Int. Cl.
*B32B 37/00* (2006.01)
(52) U.S. Cl. .................. 156/515; 156/530; 156/581; 156/583.1
(58) Field of Classification Search ........... 156/510, 156/515, 530, 580, 581, 583.1
See application file for complete search history.

(56) References Cited

U.S. PATENT DOCUMENTS 6,298,896 B1 * 10/2001 Sherrill et al. .............. 156/581
6,506,429 B1 1/2003 Recchia, Jr.
2001/0036496 A1 11/2001 Recchia, Jr.
2003/0039730 A1 2/2003 Recchia, Jr.

* cited by examiner

*Primary Examiner*—James Sells
(74) *Attorney, Agent, or Firm*—Seyfarth Shaw LLP

(57) ABSTRACT

A heat seal die assembly for heat sealing plastic sheets, both solid wall and mesh, which comprises the following: first and second heat seal bars forming heat seal lines in said plastic sheets, with the bars being spaced from each other. Each heat seal bar faces a separate backing plate, against which the plastic sheet heat sealing is effected by the heat seal bars. The separate backing plates are respectively carried by a single support plate. The backing plates are connected to the support plate by threaded members which permit adjustable spacing of each backing plate from the support plate, to correspondingly adjust the spacing of each backing plate and heat seal bar during heat sealing operations. Also, optionally, a third, separate backing plate faces a heated cutter, with the third backing plate being adjustably carried in similar manner on the support plate to provide adjustable spacing, and corresponding adjustment of cutting conditions.

6 Claims, 1 Drawing Sheet

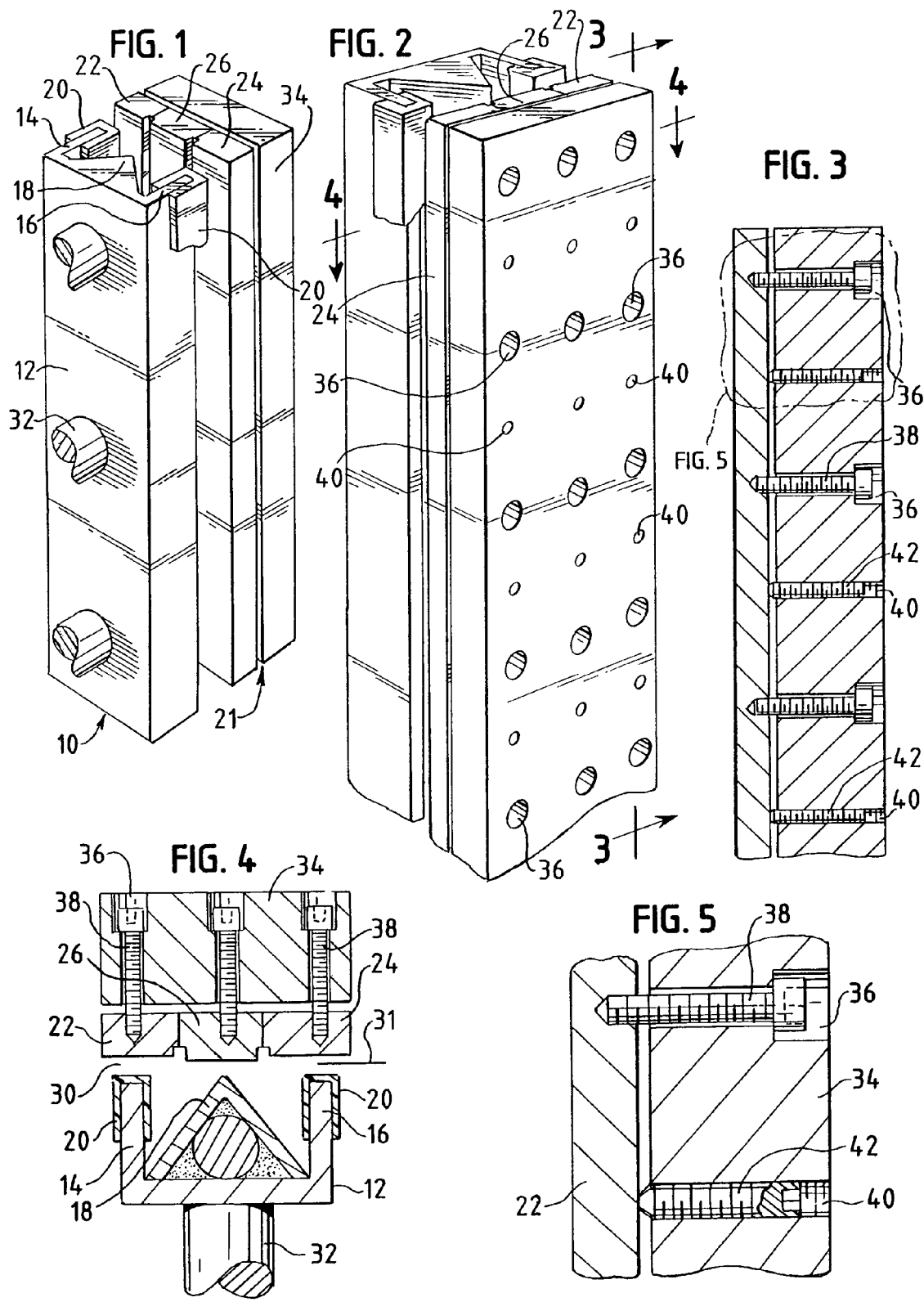

HEAT SEAL DIE ASSEMBLY

BACKGROUND OF THE INVENTION

In U.S. Patent Application Publication No. US 2003/0039730 A1, a process line for preparing and filling bags having one mesh wall with produce or the like is disclosed. In that process, rolls of plastic sheeting and mesh are advanced as a strip, sealed together, filled with product, and then closed.

A particular heat sealing die is disclosed, for forming a pair of heat seal lines, and for simultaneously cutting the sealed plastic sheeting and mesh strip between the two heat seal lines. This die exhibits significant commercial advantage of use in a high volume process of heat sealing of plastic and mesh sheets, or, if desired, mesh sheets with mesh sheets or plastic sheets with plastic sheets. Additionally, a heated cutter edge is shown, positioned between the two heat seal bars or arms.

By this invention, an improvement is provided, in which a heat seal die which forms one or more heat seal lines in plastic sheeting or mesh may have the benefit of easily adjustable spacing of the heat seal bars or arms, (and a heated cutter if present) and respective anvil blocks or backing plates used for such sealing and cutting operations, so that such spacing during sealing and/or cutting operations can be adjustably and independently controlled, to achieve optimum sealing and cutting conditions for the plastic sheet/mesh bags that are being formed. Because of the ease of adjustability, less down time in the manufacturing process may be realized, for greater manufacturing efficiency.

DESCRIPTION OF THE INVENTION

In accordance with this invention, a heat seal die assembly is provided for heat sealing plastic sheets. The heat seal die assembly comprises first and second heat seal bars, which may be separate bars, U-shaped arms as in the cited patent publication, or the like, for forming heat seal lines between plastic sheets. Typically, of course, a pair of solid plastic sheets, or a solid plastic sheet and a plastic mesh sheet are being sealed together with the seal line. The bars are spaced from each other, with each heat seal bar facing a separate backing plate, against which the plastic sheet heat sealing is effected by the heat seal bars. In this process, the heat seal bars press closely against the backing plate, but do not come into direct contact therewith, since of course the plastic sheets (solid or mesh) being sealed are between the seal bar and the backing plate, as exemplified in the above-cited patent application publication. Thus, the heat seal bars or arms are advanced to a predetermined, spaced distance from the backing plate, which distance is optimum for providing the best seal.

In accordance with this invention, the separate backing plates, which thus engage the heat seal bars/arms, are respectively carried by a single support plate. The backing plates are connected to the support plate by threaded members which permit adjustable spacing of each backing plate from the support plate, to correspondingly adjust the spacing of each backing plate and the heat seal bar during heat sealing operations. This is accomplished with relative ease by simple rotary adjustment of the threaded members, which in some embodiments may respectively comprise bolts and set screws. The bolts may serve as locking screws to retain each backing plate on the support plate, while the set screws space each backing plate from the support plate in a reliable manner. Not only can the spacing of each backing plate be thus positioned in a parallel manner from the support plate and, correspondingly from the engaging heat seal bar in the molding position, but problems of cant or nonparallel relationship can be addressed as well by the selective adjustment of the threaded members, so that each of the backing plates can not only be of different spacing compared to other backing plates, but they can be of a desired, slightly nonparallel relation to the support plate or to the respective heat seal bars, to optimize heat sealing conditions on a mass produced basis.

The term "heat seal bars" is intended in the specification to include both separate bars and connected bars, such as the U-shaped structure with heat seal arms as shown in FIG. 6 of the cited patent application publication.

It is also contemplated for the heat seal die assembly invention to preferably carry a heated cutter, for example one of a type as shown in the FIG. 6 cited above, and discussed in the cited patent application publication. In some embodiments of this invention, a heated cutter faces a third, separate backing plate, which backing plate is also connected to the support plate by more threaded members. This permits adjustable spacing of the third backing plate from the support plate, which, in turn permits adjustment of its relationship with the heated cutter, to provide dimensional adjustment of the cutting conditions, so that optimum conditions may be achieved.

Thus, in the heat seal die assembly of this invention, the various backing plates present may be easily adjusted by simple adjustments of the respective, threaded members, to independently place each backing plate into the position which provides optimum heat sealing for cutting conditions, for example as a mass production assembly line of heat sealed bags.

DESCRIPTION OF THE DRAWINGS

FIG. 1 is a perspective view, with portions broken away, of a heat seal die assembly for heat sealing plastic sheets, including solid wall sheets and/or mesh sheets.

FIG. 2 is a second perspective view of the heat seal die assembly of FIG. 1, with an unseen side being shown.

FIG. 3 is a sectional view taken along line 3-3 of FIG. 2.

FIG. 4 is a sectional view taken along line 4-4 of FIG. 2.

FIG. 5 is an enlarged, fragmentary sectional view taken from FIG. 3.

DESCRIPTION OF SPECIFIC EMBODIMENTS

Referring to the drawings, heat seal die assembly 10 comprises a sealing die member 12, which further carries first and second heat seal bars 14, 16 in spaced, parallel relation to each other, with a cutter member 18 positioned between them. The construction of heat seal die members 14, 16 and cutter member 18 may be as disclosed in the previously cited patent application publication U.S. 2003/0039730 A1, the disclosures of which are incorporated by reference. First and second heat seal bars 14, 16 may carry antiadhesive layers of a fluorinated plastic such as polytetrafluoroethylene 20, or structure 20 may comprise a removable, U-shaped body which is wrapped in a tube of such fluorinated plastic, comprising a replaceable member that is shown in FIGS. 7 and 8 and the appropriate specification of the previously cited, published patent publication.

Another major component of the heat seal die assembly shown in the drawings is backing member 21, which comprises separate backing plates 22, 24, 26. Backing plates 22 and 24 are positioned to respectively engage first and second heat seal bars 14, 16. Third backing plate 26 is positioned to engage heated cutter number 18, in a manner more specifically shown in FIG. 4. There, the engaging relationship of first heat seal bar 14 to backing plate 22, second heat seal bar 16 to backing plate 24, and cutter member 18 to backing plate 26 can be seen. The plastic sheeting 31 which is to be sealed passes in space 30 between the respective elements 14, 16, 18 and elements 22, 24, 26. As is known, sealing takes place with an advancement of sealing bar assembly 12, controlled by rods 32, to predetermined, spaced distances from the respective backing plates 22, 24, 26.

In accordance with this invention, the respective backing plates 22, 24, 26 are mounted on a single support plate 34. Support plate 34 and backing plates 22, 24, 26 carry an array of threaded apertures 36, 40. As shown in FIGS. 3-5, apertures 36 carry bolts 38, which serve as locking screws between the respective backing plates 22, 24, 26 and support plate 34. It can be seen that threaded apertures 36 are provided in alternating rows to a different set of threaded apertures 40, which carry threaded set screws 42, and press against the respective backing plate as illustrated in the case of backing plate 22 in FIGS. 3 and 5. Thus, the distance of each of the backing plates 22, 24, 26 can be precisely, independently and variably positioned with respect to support plate 34. The effect of this, of course is to precisely adjust the position of each backing plate 22, 24, 26 with respect to first and second heat seal bars 14, 16 and cutter member 18, so that the respective backing plates may be variably adjusted, independent of each other, to optimize the sealing and cutting conditions provided by heat seal die 10. Also, these conditions may be adjusted as needed by the simple adjustment of the respective screws 38, 42 to achieve optimum sealing and cutting conditions on a continuing basis, particularly in high volume manufacturing processes.

The above has been offered for illustrative purposes only, and it is not intended to limit the scope of the invention of this application, which is as defined in the claims below.

What is claimed is:

1. A heat seal die assembly for heat sealing plastic sheets, which comprises:

first and second heat seal bars for forming heat seal lines in at least one plastic sheet, said bars being spaced from each other;

each heat seal bar facing a separate backing plate, against which the plastic sheet heat sealing is effected by said heat seal bars, said separate backing plates being respectively carried by a single support plate, said backing plates being connected to said support plate by threaded members which permit adjustable spacing of each backing plate from the support plate, to correspondingly adjust the spacing of each backing plate and heat seal bar during heat sealing operations.

2. The heat seal die assembly of claim 1, in which a heated cutter faces a third, separate backing plate, said third backing plate being also connected to said support plate by threaded members, which permits adjustable spacing of the third backing plate from the support plate, to permit adjustment of cutting conditions.

3. The heat seal die assembly of claim 1, in which the threaded members comprise locking screws to retain each backing plate on the support plate and set screws to spaced each backing plate from the support plate.

4. The heat seal die assembly of claim 3, in which a heated cutter faces a third, separate backing plate, said third backing plate being also connected to said support plate by threaded members, which permits adjustable spacing of the third backing plate from the support plate, to permit adjustment of cutting conditions.

5. A die assembly for cutting plastic sheets, which comprises:

a heated cutter which faces one of a plurality of separate backing plates, said separate backing plates being respectively carried by a single support plate, said backing plates being connected to the support plate by threaded members which permit adjustable spacing of each backing plate from the support plate, to correspondingly adjust the spacing of each backing plate and said cutter during cutting operations.

6. The assembly of claim 5 in which the threaded members comprise locking screws to retain each backing plate on the support plate, and set screws to space each backing plate from the support plate.

* * * * *